Figure 1:
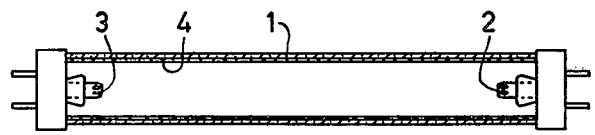

United States Patent [19]
Verstegen et al.

[11] 3,956,663
[45] May 11, 1976

[54] LUMINESCENT SCREEN WITH THALLIUM ACTIVATED ALUMINATE

[75] Inventors: Judicus Marinus Pieter Jan Verstegen; Willebrordus Hubertus Martinus Maria van de Spijker; Cornelis Wilhelmus Anthonius Schetters, all of Eindhoven, Netherlands

[73] Assignee: U.S. Philips Corporation, New York, N.Y.

[22] Filed: Jan. 6, 1975

[21] Appl. No.: 538,718

[30] Foreign Application Priority Data
Jan. 10, 1974  Netherlands .................... 7400329

[52] U.S. Cl. ..................... 313/486; 252/301.4 R
[51] Int. Cl.² .................. C09K 11/26; C09K 11/30; H01J 61/44
[58] Field of Search .............. 313/486; 252/301.4 R

[56] References Cited
UNITED STATES PATENTS 3,502,592  3/1970  Amster .................... 252/301.4 R
3,577,169  5/1971  Barry ......................... 313/486
3,577,350  5/1971  Amster .................... 252/301.4 R

*Primary Examiner*—Palmer C. Demeo
*Attorney, Agent, or Firm*—Frank R. Trifari; Norman N. Spain

[57] ABSTRACT

A luminescent screen, particularly for a low-pressure mercury vapor discharge lamp, provided with a luminescent thallium-activated aluminate having the β-alumina structure and defined by the formula $(Me^I_{1-x-p}Tl_xMe^{II}_p)(Al_{11-y}Mn_y)O_{17}$ in which $Me^I$ represents at least one of the alkali metals sodium, potassium and rubidium, and in which $Me^{II}$ represents at least one of the alkaline earth metals calcium, strontium and barium, in which up to 50 mol % of aluminum may be replaced by gallium, and in which $0.1 \leq x \leq 0.9$ $0 \leq y \leq 0.5$ $0 \leq p \leq 0.5$ $x+p \leq 1.0$

7 Claims, 2 Drawing Figures

U.S. Patent    May 11, 1976    3,956,663

LUMINESCENT SCREEN WITH THALLIUM ACTIVATED ALUMINATE

The invention relates to a luminescent screen provided with a luminescent thallium-activated aluminate. Furthermore, the invention relates to a low-pressure mercury vapour dischage lamp provided with such a luminescent screen, and to the luminescent aluminate itself.

Aluminates defined by the general formula $M^I Al_{11} O_{17}$ in which $M^I$ represents one of the elements sodium, potassium, rubidium and cesium are known by the name of $\beta$-alumina. The crystal structure of $\beta$-alumina has a hexagonal symmetry and is quite akin to the structure of hexagonal magnetoplumbite. In addition to $\beta$-alumina defined by the above-mentioned formula, aluminates are known which are defined by the formula $M^I Al_5 O_8$ having a crystal structure slightly deviating from that of $\beta$-alumina. These aluminates are generally referred to as the low-temperature modifications of $\beta$-alumina or as $\beta''$-alumina.

Upon activation of $\beta$-alumina by manganese luminescent materials are obtained which luminesce efficiently only when oxcited by electrons (see the book by F. A. Kröger: "Some Aspects of the Luminescence of Solids", 1948). Activation of $\beta''$-alumina by manganese is known from U.S. Pat. No. 3,576,757. Activation of $\beta''$-alumina by europium or by europium and manganese is described in U.S. Pat. No. 3,577,350.

Aluminates defined by the general formula $M^{II} Al_2 O_4$ in which $M^{II}$ represents a bivalent ion, for example, calcium, strontium or barium can be activated by thallium (see J.Opt.Soc.Am. 37 (1947) 355). Materials are then obtained which emit in the near ultraviolet part of the spectrum when excited by short-wave ultraviolet radiation. The quantum efficiency of these known materials at this excitation is low (in the order of 5%), so that only slight luminous fluxes are achieved.

A luminescent screen according to the invention is provided with a luminescent thallium-activated aluminate and is characterized in that the aluminate has the hexagonal crystal structure of $\beta$-alumina and is defined by the formula $(Me^I_{1-x-p} Tl_x Me^{II}_p)(Al_{11-y} Mn_y) O_{17}$ in which $Me^I$ represents at least one of the alkali metals sodium, potassium and rubidium, and $Me^{II}$ represents at least one of the alkaline earth metals calcium, strontium and barium, and in which up to 50 mol % of aluminium may be replaced by gallium, and in which $0.1 \leq x \leq 0.9$ $0 \leq y \leq 0.5$ $0 \leq p \leq 0.5$ $x+p \leq 1.0$ It has been found that upon activation of $\beta$-alumina by thallium, in which thallium replaces part of the alkali metal denoted by $Me^I$, very efficient luminescent materials are obtained. The luminescent aluminates according to the invention may be satisfactorily excited (quantum efficiency approximately a factor of 10 larger than that of the known thallium-activated aluminates) by short-wave ultraviolet radiation, particularly by radiation from a low-pressure mercury vapour discharge. An intensive emission is obtained in a band (half-value width approximately 50 nm) with a maximum at 380–390 nm.

It has been found that in the aluminates according to the invention aluminum may be replaced by gallium while maintaining the $\beta$-alumina structure. Replacement of aluminum by gallium generally yields no extra advantages and with smaller quantities of gallium it has little influence on the luminescence properties. In the aluminates according to the invention not more than 50 mol % of aluminum is replaced by gallium, because with larger quantities of gallium materials are obtained with a too low luminous flux. Furthermore, small quantities of the alkali metal denoted by $Me^I$ may be replaced by one or more of the alkaline earth metals denoted by $Me^{II}$, while maintaining the crystal structure.

As is apparent from the above-mentioned general formula for the aluminates according to the invention, manganese in addition to thallium may alternatively be used as an activator in these materials. When using thallium and manganese as activators, there is an efficient energy transfer from thallium to manganese. In case of suitable choice of the concentrations of thallium and manganese, this transfer may be substantially complete, so that only the manganese emission (narrow band at approximately 514 nm) is obtained. Upon activation by manganese part of the aluminium is replaced by the manganese activator. Preferably, part of the alkali metal $Me^I$ is then simultaneously replaced by one or more of the alkaline earth metals $Me^{II}$. In this manner a charge compensation is obtained, which is very desirable when replacing aluminium by manganese.

The thallium content $x$ of the luminescent aluminates according to the invention may be chosen within the wide limits mentioned above. Also at relatively high thallium contents (up to $x=0.9$) a large luminous flux is obtained. At values of $x$ of less than 0.1 too low luminous fluxes are obtained for practical use. If an aluminate according to the invention comprises manganese, the manganese content $y$ is chosen to be not more than 0.5, because at higher values of $y$ lower luminous fluxes are obtained due to concentration quenching.

In the aluminates according to the invention the sum of the contents $x$ and $p$ cannot of course exceed the value 1.

In the aluminates according to the invention the content $p$ is preferably chosen to be substantially equal to the content $y$. This means that in the aluminates activated by thallium only there is preferably no substitution of $Me^I$ for $Me^{II}$, because such a substitution has few advantages in these cases. In the aluminates according to the invention that are activated by both thallium and manganese, when substituting aluminum for manganese, preferably a substantially equal quantity of the $Me^I$ atoms is, however, replaced by $Me^{II}$ atoms, because a complete charge compensation is then obtained.

A preferred embodiment of a luminescent screen according to the invention comprises an aluminate defined by the above-mentioned general formula, in which the manganese content $y$ is zero and the thallium content $x$ has a value of between 0.3 and 0.75. In fact, the most efficient thallium emission is obtained with these aluminates. Such screens may be advantageously used in low-pressure mercury vapour discharge lamps, particularly in lamps for use in photochemical processes.

A further preferred embodiment of a luminescent screen according to the invention comprises an aluminate according to the invention in which the thallium content has a value of between 0.3 and 0.7 and the manganese content has a value of between 0.3 and 0.5. A very efficient manganese emission is obtained with these aluminates. The energy transfer from thallium to manganese is found to be substantially complete in these materials. These thallium and manganese-activated aluminates are particularly used in low-pressure mercury vapour discharge lamps especially for use in electrophotographic, for example, xerographic reproduction processes.

Sodium is preferably chosen for the element denoted by $Me^I$, because the highest luminous fluxes are then achieved, as will be shown hereinafter.

In the manufacture of the luminescent aluminates according to the invention the aluminate fundamental lattice is preferably manufactured first. This may be effected, for example, by heating once or more times in air a mixture of oxides of the elements present in the material or of compounds producing these oxides upon an increase in temperature, at a temperature of between 700° and 1400°C. It is advantageous to use the $Me^I$ compound in an excess (for example, a 100% excess relative to the stoichiometrically required quantity), because then the reaction proceeds completely within a short time. The excess of the $Me^I$ compound may be removed by washing with water after the reaction. To enchance the reaction a flux may be used. For this purpose a small quantity of aluminium may be added as aluminum fluoride. The fundamental lattice compound thus obtained may be activated by mixing the material with a thallium compound, for example, thallium sulphate and by subsequently firing the mixture at 700°–1400°C. The fundamental lattice is activated by thallium preferably by mixing the fundamental lattice with $Me^INO_3$ and $TlNO_3$ and by subsequently heating the mixture to above the melting point of the mixture of nitrates. Generally, a large excess of $Me^I$-$NO_3$ and $TlNO_3$ is used, for example, 10 mol $Me^INO_3$ + $TlNO_3$ per mol of $Me^IAl_{11}O_{17}$, which excess is removed by washing after the activation. The mutual ratio of the quantities of $Me^INO_3$ and $TlNO_3$ to be used determines the thallium content of the luminescent aluminate obtained. The aluminates according to the invention are preferably activated by manganese when the fundamental lattice is formed as has been described hereinbefore. The starting mixture then comprises a manganese compound and at least the last heating stage in the manufacture of the fundamental lattice is effected in a weakly reducing atmosphere.

The invention will now be described in greater detail with reference to an example, a number of measurements and a drawing.

Figure 2:
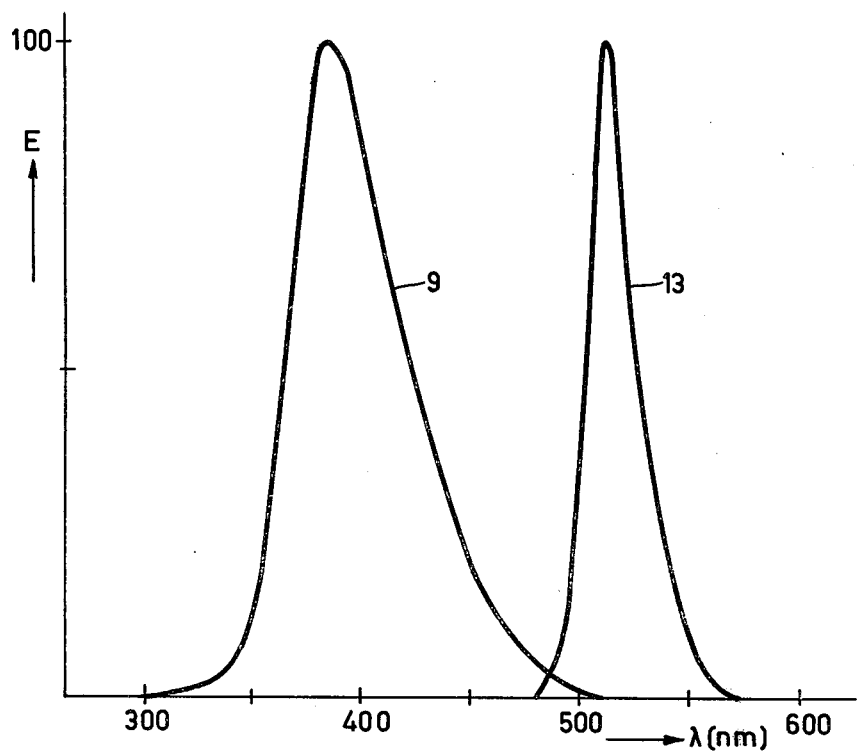

FIG. 1 shows a low-pressure mercury vapour discharge lamp having a luminescent screen according to the invention, and FIG. 2 shows the spectral distribution of the emitted radiation of two luminescent aluminates according to the invention.

EXAMPLE.

A mixture is made of
2.76 g $K_2CO_3$
11.00 g $Al_2O_3$
0.60 g $AlF_3.3H_2O$

This mixture is fired for 2 hours at 800°C in air. After cooling and pulverizing the product obtained is again fired in air for 1 hour at 1300°C. After cooling the reaction product is washed with water and subsequently filtered and dried. The aluminate fundamental lattice thus obtained is defined by the formula $KAl_{11}O_{17}$ and according to X-ray diffraction analyses is found to have the $\beta$-alumina structure. To activate this fundamental lattice by thallium, the aluminate is mixed with 10 mol of a mixture of 90 mol % $KNO_3$ and 10 mol % $TlNO_3$ per mol of aluminate. This mixture is heated in air for 2 hours at such a temperature that the nitrates melt, for example, at 350°C. After cooling the excess of $TlNO_3$ and $KNO_3$ is washed with water. Any $Tl_2O$ possibly formed during the reaction may be removed by washing with hydrochloric acid and subsequently by washing with water. Analyses show that the luminescent aluminate then obtained is defined by the formula $K_{0.5}Tl_{0.5}Al_{11}O_{17}$.

The following Table I gives a summary of measurements on a number of thallium-activated aluminates according to the invention, all of which were manufactured in an analogous manner as described hereinbefore. In addition to the formula for the relevant aluminate (column 2), column 3 states the mol ratio of $Me^I$-$NO_3$ : $TlNO_3$ used for activation of the aluminate. At this activation stage 10 mol ($Me^INO_3$+$TlNO_3$) per mol of the fundamental lattice was used. The quantum efficiency of the aluminate upon excitation by short-wave ultraviolet radiation (predominantly 254 nm) is indicated in % under the heading QR. The measured value of the luminous flux is indicated in % relative to a standard luminescent material under the breading LO. An antimony and manganese-activated calcium halophosphate is used as a standard. This halophosphate is mixed with non-luminescent calcium carbonate in such quantities that the luminous flux has been reduced to approximately 50% of the non-mixed halophosphate. Finally, Table I shows under $\lambda_{max}$ the location of the maximum of the emission band in the spectrum.

TABLE 1

| Ex. | Formula | $Me^INO_3:TlNO_3$ | QR in % | LO in % | $\lambda_{max}$ (nm) |
|---|---|---|---|---|---|
| 1. | $K_{0.1}Tl_{0.9}Al_{11}O_{17}$ | 1 : 1 | 45 | 144 | 390 |
| 2. | $K_{0.25}Tl_{0.75}Al_{11}O_{17}$ | 3 : 1 | 55 | 177 | 390 |
| 3. | $K_{0.4}Tl_{0.6}Al_{11}O_{17}$ | 5 : 1 | 56 | 181 | 390 |
| 4. | $K_{0.5}Tl_{0.5}Al_{11}O_{17}$ | 9 : 1 | 59 | 189 | 390 |
| 5. | $K_{0.65}Tl_{0.35}Tl_{11}O_{17}$ | 19 : 1 | 59 | 188 | 390 |
| 6. | $K_{0.71}Tl_{0.29}Al_{11}O_{17}$ | 24 : 1 | 55 | 176 | 390 |
| 7. | $K_{0.84}Tl_{0.16}Al_{11}O_{17}$ | 49 : 1 | 43 | 137 | 390 |
| 8. | $K_{0.9}Tl_{0.1}Al_{11}O_{17}$ | 99 : 1 | 23 | 75 | 390 |
| 9. | $Na_{0.5}Tl_{0.5}Al_{11}O_{17}$ | 9 : 1 | 68 | 219 | 380 |
| 10. | $Na_{0.25}Tl_{0.75}Al_{11}O_{17}$ | 3 : 1 | 59 | 190 | 380 |
| 11. | $Rb_{0.5}Tl_{0.5}Al_{11}O_{17}$ | 9 : 1 | 57 | 210 | 380 |
| 12. | $Rb_{0.25}Tl_{0.75}Al_{11}O_{17}$ | 3 : 1 | 47 | 175 | 380 |

Measurements on both thallium and manganese-activated aluminates are summarized in Table II. The materials of Table II are manufactured in an analogous manner as described in the above-mentioned example. However, in the manufacture of the fundamental lattice the manganese activator was also built in. To this end a manganese compound, for example, $MnCO_3$ was added in the desired quantity to the starting mixture and the second heating stage for forming the lattice (1 hour at 1300°C) was effected in a weakly reducing atmosphere.

TABLE II

| Example | Formula | QR in % | LO in % | $\lambda_{max}$ (nm) |
|---------|---------|---------|---------|----------------------|
| 13. | $K_{0.2}Tl_{0.5}Ba_{0.3}Al_{10.7}Mn_{0.3}O_{17}$ | 42 | 132 | 514 |
| 14. | $K_{0.1}Tl_{0.5}Ba_{0.4}Al_{10.6}Mn_{0.4}O_{17}$ | 53 | 175 | 514 |
| 15. | $Tl_{0.5}Ba_{0.5}Al_{10.5}Mn_{0.5}O_{17}$ | 33 | 110 | 514 |
| 16. | $Na_{0.2}Tl_{0.5}Ba_{0.3}Al_{10.7}Mn_{0.3}O_{17}$ | 51 | 193 | 514 |
| 17. | $Na_{0.1}Tl_{0.5}Ba_{0.4}Al_{10.6}Mn_{0.4}O_{17}$ | 45 | 179 | 514 |
| 18. | $Rb_{0.2}Tl_{0.5}Ba_{0.3}Al_{10.7}Mn_{0.3}O_{17}$ | 48 | 152 | 514 |
| 19. | $Rb_{0.1}Tl_{0.5}Ba_{0.4}Al_{10.6}Mn_{0.4}O_{17}$ | 49 | 156 | 514 |

In FIG. 1 the reference numeral 1 denotes the glass envelope of a low-pressure mercury vapour discharge lamp according to the invention. Electrodes 2 and 3 between which the discharge takes place during operation of the lamp are provided at the ends of the lamp. The inner side of the envelope 1 is coated with a luminescent coating 4 comprising a luminescent aluminate according to the invention. The luminescent coating 4 may be provided on the envelope 1 by any of the generally known methods.

The spectral energy distribution of the emitted radiation of two luminescent aluminates according to the invention upon excitation by short-wave ultraviolet radiation (predominantly 254 nm) is shown in the form of a graph in FIG. 2. The wavelength λ is plotted in nm on the horizontal axis and the radiation energy E per constant wavelength interval is plotted in arbitrary units on the vertical axis. The curve denoted by 9 relates to example 9 of Table I and curve 13 relates to example 13 of Table II. The maximum radiation energy is fixed at 100 for both curves.

What is claimed is:

1. A luminescent screen provided with a luminescent thallium-activated aluminate, characterized in that the aluminate has the hexagonal crystal structure of β-alumina and is defined by the formula $(Me^{I}_{1-x-p}Tl_{x}Me^{II}_{p})(Al_{11-y}Mn_{y})O_{17}$ in which $Me^{I}$ represents at least one of the alkali metals sodium, potassium and rubidium and $Me^{II}$ represents at least one of the alkaline earth metals calcium, strontium and barium, in which up to 50 mol % of aluminium may be replaced by gallium, and in which $$0.1 \leq x \leq 0.9$$

$$0 \leq y \leq 0.5$$

$$0 \leq p \leq 0.5$$

$$x+p \leq 1.0.$$

2. A luminescent screen as claimed in claim 1, characterized in that $p$ is substantially equal to $y$.

3. A luminescent screen as claimed in claim 2, characterized in that $y=0$ and $0.3 \leq x \leq 0.75$.

4. A luminescent screen as claimed in claim 2, characterized in that $0.3 \leq y \leq 0.5$ and $0.3 \leq x \leq 0.7$.

5. A luminescent screen as claimed in claim 2, characterized in that $Me^{I}$ is sodium.

6. A low-pressure mercury vapor discharge lamp provided with a luminescent screen as claimed in claim 1.

7. A luminescent thallium-activated aluminate having the β-alumina structure defined by the formula $(Me^{I}_{1-x-p}Tl_{x}Me^{II}_{p})(Al_{11-y}Mn_{y})O_{17}$ in which $Me^{I}$ represents at least one of the alkali metals sodium, potassium and rubidium, and $Me^{II}$ represents at least one of the alkaline earth metals calcium, strontium and barium, in which up to 50 mol % of aluminium may be replaced by gallium, and in which $$0.1 \leq x \leq 0.9$$

$$0 \leq y \leq 0.5$$

$$0 \leq p \leq 0.5$$

$$x+p \leq 1.0$$

* * * * *